US011131994B2

(12) United States Patent
Michalakis et al.

(10) Patent No.: US 11,131,994 B2
(45) Date of Patent: Sep. 28, 2021

(54) DEBUGGING AN AUTONOMOUS DRIVING MACHINE LEARNING MODEL

(71) Applicant: TOYOTA RESEARCH INSTITUTE, INC., Los Altos, CA (US)

(72) Inventors: Nikolaos Michalakis, San Francisco, CA (US); Julian M. Mason, San Francisco, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 0 days.

(21) Appl. No.: 16/929,905

(22) Filed: Jul. 15, 2020

(65) Prior Publication Data
US 2020/0348670 A1    Nov. 5, 2020

Related U.S. Application Data

(63) Continuation of application No. 16/012,290, filed on Jun. 19, 2018, now Pat. No. 10,747,224.

(51) Int. Cl.
*G05D 1/00* (2006.01)
*G06K 9/00* (2006.01)
*G06N 20/00* (2019.01)

(52) U.S. Cl.
CPC ....... *G05D 1/0088* (2013.01); *G06K 9/00805* (2013.01); *G06N 20/00* (2019.01); *G05D 2201/0213* (2013.01)

(58) Field of Classification Search
CPC ......... G05D 1/0088; G05D 2201/0213; G06N 20/00; G06N 3/006; G06N 3/084; G06N 3/0454; G06K 9/00805; G06K 9/6273; B60W 2420/42; B60W 2556/20; B60W 2556/55; B60W 2050/0075; B60W 60/0015
See application file for complete search history.

(56) References Cited

U.S. PATENT DOCUMENTS

| 10,747,224 | B2 | 8/2020 | Michalakis et al. |
| 2017/0024643 | A1* | 1/2017 | Lillicrap ................. G06N 3/006 |
| 2017/0192423 | A1* | 7/2017 | Rust .................... G01C 21/3492 |

* cited by examiner

*Primary Examiner* — Anne Marie Antonucci
(74) *Attorney, Agent, or Firm* — Seyfarth Shaw LLP

(57) ABSTRACT

A method for improving an autonomous driving system for an autonomous vehicle is disclosed. The method includes sub-sampling a frame generated by an output of a sensor and transmitting, to a remote device, the sub-sampled frame and classification data corresponding to the sub-sampled frame. The method also includes receiving, from the remote device, an adjustment to the autonomous driving system in response to the transmitted sub-sampled frame and classification data. The method further includes controlling an action of the autonomous vehicle based on the adjusted autonomous driving system.

20 Claims, 7 Drawing Sheets

DEBUGGING AN AUTONOMOUS DRIVING MACHINE LEARNING MODEL

CROSS-REFERENCE TO RELATED APPLICATION

The present application is a continuation of U.S. patent application Ser. No. 16/012,290, filed on Jun. 19, 2018, and titled "DEBUGGING AN AUTONOMOUS DRIVING MACHINE LEARNING MODEL," the disclosure of which is expressly incorporated by reference herein in its entirety.

FIELD

Certain aspects of the present disclosure generally relate to machine learning and, more particularly, to a system and method for debugging a machine learning model.

BACKGROUND

Autonomous agents (e.g., vehicles, robots, drones, etc.) and semi-autonomous agents may use object detection models, such as a trained convolutional neural network (CNN), to identify objects of interest in an image. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as the autonomous agent.

To improve machine learning models, such as the object detection model, human analysts may analyze the accuracy of the machine learning models used in real-world scenarios. In conventional systems, to determine a model's accuracy, the analysts analyze a video and the corresponding classification data. The analysts may also analyze the raw sensor data. In most cases, the video is a high resolution video. To facilitate the analysis, the agent transmits both the video and the classification data to a remote server.

Due to the limited bandwidth of wireless networks, conventional autonomous agents do not transmit the video and the classification data via a wireless network while an agent is active in an environment. Rather, conventional agents upload the video and the classification data to the server when the autonomous agent is at a location, such as a garage at a home, with a high bandwidth connection, such as a fiber-optic Internet connection. As such, there is a delay between a time when the classification data and the video are generated and a time when the classification data and video are uploaded to the server. It is desirable to stream classification data and videos to the server, via a wireless network, while the autonomous agent is operating in a real-world environment.

SUMMARY

In one aspect of the present disclosure, a method for improving an autonomous driving system for an autonomous vehicle is disclosed. The method includes sub-sampling a frame generated by an output of a sensor. The method also includes transmitting, to a remote device, the sub-sampled frame and classification data corresponding to the sub-sampled frame. The method further includes receiving, from the remote device, an adjustment to the autonomous driving system in response to the transmitted sub-sampled frame and classification data. The method still further includes controlling an action of the autonomous vehicle based on the adjusted autonomous driving system.

In another aspect of the present disclosure, a non-transitory computer-readable medium with non-transitory program code recorded thereon is disclosed. The program code is for improving an autonomous driving system for an autonomous vehicle. The program code is executed by a processor and includes program code to sub-sample a frame generated by an output of a sensor. The program code also includes program code to transmit, to a remote device, the sub-sampled frame and classification data corresponding to the sub-sampled frame. The program code further includes program code to receive, from the remote device, an adjustment to the autonomous driving system in response to the transmitted sub-sampled frame and classification data. The program code still further includes program code to control an action of the autonomous vehicle based on the adjusted autonomous driving system.

Another aspect of the present disclosure is directed to an apparatus for improving an autonomous driving system for an autonomous vehicle. The apparatus having a memory and one or more processors coupled to the memory. The processor(s) is configured to sub-sample a frame generated by an output of a sensor. The processor(s) is also configured to transmit, to a remote device, the sub-sampled frame and classification data corresponding to the sub-sampled frame. The processor(s) is further configured to receive, from the remote device, an adjustment to the autonomous driving system in response to the transmitted sub-sampled frame and classification data. The processor(s) still further configured to control an action of the autonomous vehicle based on the adjusted autonomous driving system.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
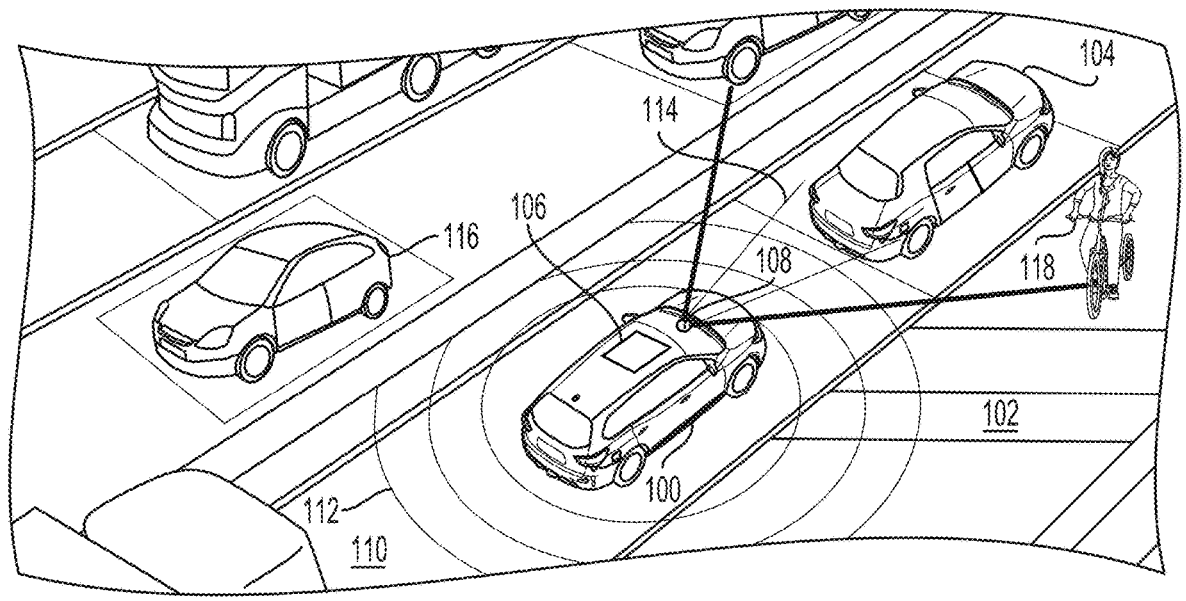
FIG. 1A illustrates an example of an autonomous agent according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Actions of autonomous agents and semi-autonomous agents may be controlled or adjusted based on objects detected within a vicinity of the agent. For example, a route may be planned for an autonomous agent based on the locations of other objects on the road. As another example, a route may be adjusted to avoid a collision if a detected object is in the path of the agent. In the present disclosure, an agent refers to an autonomous agent or a semi-autonomous agent.

The agent may detect objects from outputs of various sensors. For example, a 2D camera may generate 2D red-green-blue (RGB) images and a light detection and ranging (LIDAR) sensor may generate a 3D point cloud that provides height and depth information. The sensor outputs may be combined into a frame, where a sequence of frames generates a video. Object detection models, such as a convolutional neural network (CNN), are trained to identify objects of interest in each frame. Each identified object may be annotated with a bounding box. For each frame of a sequence of frames, the model may output a classification label corresponding to each identified object and a bounding box corresponding to a location of each object. The object detection model may be referred to as the model.

To improve the model, it is desirable for a human to determine the model's accuracy by visually analyzing the output of the model and a corresponding frame. That is, in most cases, when presented with a high resolution annotated frame, the developer may determine whether a model correctly identified an object in the frame. Specifically, the developer may visually determine whether an accuracy of the model's classifications and/or annotations are greater than an accuracy threshold. An annotated frame refers to a frame that includes the generated bounding box. The annotated frame may also include the classification label or a reference to the classification label.

The analysis may reveal errors (e.g., bugs) in the model. The errors may be caused by an error in the model, an error in the model's computer code, and/or an error in the training data. In one configuration, the model may be a set of weights. The model with only a set of weights may not be inserted in programming code. Still, the code may use the weights to make decisions, to cover for corner cases, or to make improvements to the model. That is, the model may be wrapped in code. For example the pseudo-code may be as follows:

```
if (pixels in region_A of the image look like an octagon) {
    detect stop sign
}
else {
    multiply the weights of the model
    with every pixel in the picture to
    detect any other objects
}
```

In the above pseudo-code example, the model is only used in the else statement. In some cases, the code may have an error that is detected with new data. Thus, there is a difference between an error in the code and an error in the model (e.g., the weights). After identifying the error, one or more elements of the model may be adjusted to mitigate the error. For example, the error may be mitigated by updating the model, updating the code, and/or re-training the model with adjusted training data. Finally, one or more updates may be transmitted to the agent to mitigate the error.

The video generated by a machine learning model may be a high resolution (e.g., high quality) video. Therefore, the size of the video file may be large. For example, the size of a video file may be more than twice a size of the output of an object detection model. As is known to those of skill in the art, conventional wireless networks have limited bandwidth. Furthermore, a coverage area of conventional wireless networks is not uniform, resulting in inconsistent quality of service. Therefore, conventional wireless networks may lack the capacity to stream the video from the agent to a remote server while the agent is actively operating in an environment.

In conventional systems, data is uploaded to a remote device, such as a server, when the autonomous agent is parked at a location, such as a garage at a home, with a high bandwidth data connection. That is, in conventional systems, the data is transmitted when the agent has established a high bandwidth connection with the remote device. The data may include the video and the output of the object detection model. Additionally, in some cases, the agent also uploads the sensor data.

The data transmitted via the high bandwidth connection may be used to analyze a model and update the model. Conventional autonomous driving systems update models using a batch approach. In the batch approach, a model is trained with a data set and deployed to agents. As more data is collected over time, the model may be re-trained. If the re-trained model is an improvement on the previous model, the re-trained model is deployed. The time between training an initial model and re-training the model may be in the order of days or months. Therefore, conventional autonomous driving systems do not provide a solution for rapid deployment of model updates, incremental model updates, model diffs, and/or model rollbacks.

In one configuration, to mitigate the limitations of conventional systems, frames of a video are sub-sampled to reduce the video's memory footprint. By reducing the memory footprint, the sub-sampled video and model output may be streamed to a remote device via a wireless communication system while an agent is active in an environment. The streamed video and model output may be reviewed by an analyst in substantial real time, thereby reducing a timeframe for improving the model and/or other components of an autonomous driving system. Based on a review of the streamed video and model output, the model may be improved by deploying rapid model updates, incremental model updates, performing model diffs, and/or initiating model rollbacks as necessary. In one configuration, in addition to streaming the sub-sampled video and sensor data while the agent is active, the high resolution video is transmitted to the server after the parked agent has established a high bandwidth connection with the server.

Upon receipt of one or more sub-sampled frames and the corresponding model output at a remote device, a human analyst may review a sub-sampled frame that has been annotated based on the received model output. That is, the annotated video may be reconstructed at a server based on the received labels, features, and sub-sampled video. The analyst may determine whether a bounding box is drawn around a correct object. Additionally, the analyst may verify whether an object has been correctly labeled. Based on the visual analysis, the analyst may determine whether there is an error in the classification and/or annotation. Upon detecting the error, the analyst may analyze additional frames from the agent and/or other agents to determine whether the error is an anomaly (e.g., one time error) or a persistent error. As discussed above, the error may be caused by an error in the model, an error in the model's computer code, and/or an error in the training data.

In one configuration, when an error is detected, the analyst flags the timestamp of the error. The remote device may transmit a message to the agent indicating that an error has occurred at the flagged timestamp. In response to the message, the agent saves a pre-determined amount of data (e.g., video data, sensor data, and model output data) that was obtained before, during, and after the flagged timestamp. In this configuration, the agent uploads the saved data when a high bandwidth connection is established with the remote device. Upon receipt of the data, the analyst may review the uploaded data to determine the cause of the error.

After determining the cause of the error, one or more elements of the model may be adjusted to correct the error. For example, if the error is a result of a training error, the model may be re-trained with updated training data. After re-training, if the re-trained model is an improvement on the previous model, the agent may receive the adjusted model via a broadcast transmission, an Internet download, an update at a service center, or another system for upgrading the stored model. If the re-trained model has not improved, the model may undergo further training.

As another example, an error may be caused by a recent software update. In this example, the software update may be rolled back to a previous version. The roll back may be referred to as a rapid roll back. In conventional systems, a time period for a software roll back is weeks or months. In contrast, by reducing the time for receiving feedback from the in-field deployment of software updates, the time period for a software roll back may be reduced to hours. In one configuration, to determine a software error, the analyst may perform a comparison between the current code and the previous code (e.g., diff operation) to determine the cause of the error.

FIG. 1A illustrates an example of an agent 100 using sensors 106, 108 to detect objects 104, 116, 118, according to aspects of the present disclosure. As shown in FIG. 1A, the agent 100 may be traveling on a road 110. A first vehicle 104 may be ahead of the agent 100 and a second vehicle 116 may be adjacent to the agent 100. Additionally, a cyclist 118 may be in a bike lane 102 adjacent to the agent 100. In this example, an object detection system of the agent 100 is in communication with a 2D camera 108, such as a 2D RGB camera, and a LIDAR sensor 106. The 2D camera 108 and the LIDAR sensor 106 may be integrated with the agent 100. Other sensors, such as radio detection and ranging (RADAR) and/or ultrasound, are also contemplated. Additionally, or alternatively, the agent 100 may include one or more additional 2D cameras and/or LIDAR sensors. For example, the additional sensors may be side facing and/or rear facing sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream may include a 3D cloud point of objects in a second field of view, such as a forward facing field of view 126. The object detection system may use the data streams of the LIDAR sensor 106 to detect objects in an environment.

The 2D image captured by the 2D camera includes a 2D image of the first vehicle 104 and the cyclist 118, as the first vehicle 104 and the cyclist 118 are in the 2D camera's 108 field of view 114. The object detection system of the agent 100 may extract features from objects of interest in the 2D image. For example, an artificial neural network, such as a convolutional neural network, of the object detection system extracts features of the first vehicle 104 and the cyclist 118. Based on the extracted features, the object detection system may classify the first vehicle 104 as a car and the cyclist 118 as a bicycle rider. Furthermore, the object detection system may localize the first vehicle 104 and the cyclist 118 within a first frame 150, shown in FIG. 1B.

Figure 1B:
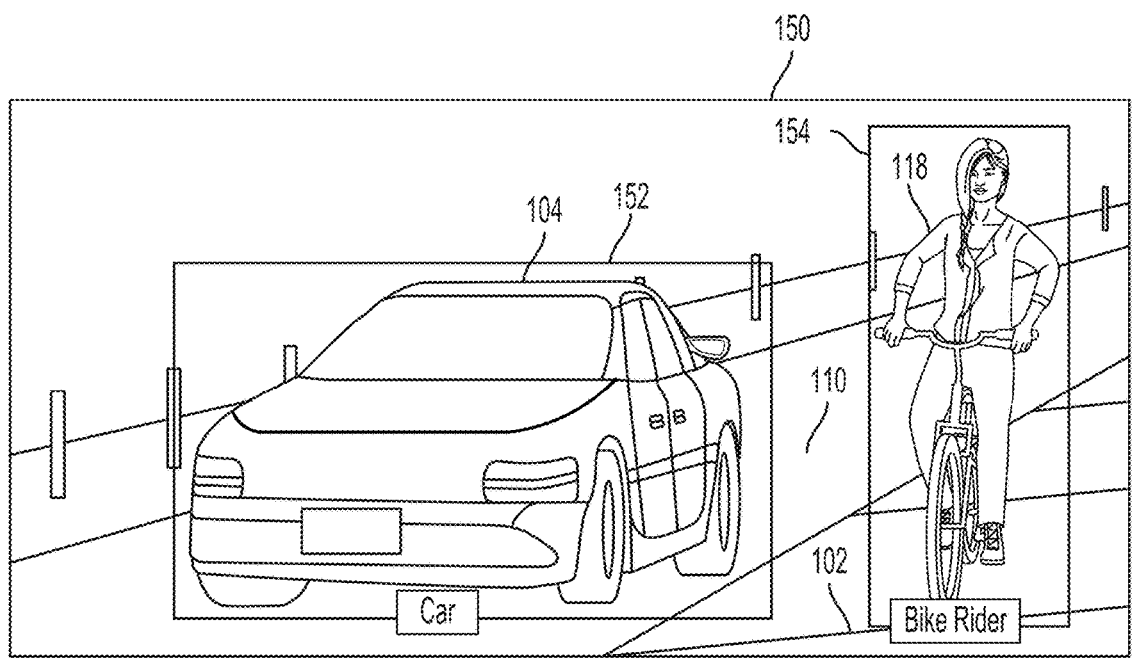
FIGS. 1B, 1C, and 1D illustrate examples of annotated frames according to aspects of the present disclosure.

FIG. 1B illustrates an example of the frame 150 generated by an object detection system, according to aspects of the present disclosure. In the present example, the frame 150 includes objects in the 2D camera's 108 field of view 114. Specifically, the frame includes the first vehicle 104 and the cyclist 118, as both the first vehicle 104 and the cyclist 118 are in the 2D camera's 108 field of view 114.

Based on the features extracted by an object detection model, the first vehicle 104 and the cyclist 118 are labeled (e.g., "car" and "bike rider"). The object detection system also localizes the first vehicle 104 and the cyclist 118 by annotating the locations of each object with a bounding box 152, 154 generated by the object detection model. As shown in FIG. 1B, a first bounding box 152 is drawn around an area corresponding to the first vehicle 104 and a second bounding box 154 is drawn around an area corresponding to the cyclist 118. The labels of FIG. 1B are for illustrative purposes, aspects of the present disclosure are not limited to labeling objects according to the labels shown in FIG. 1B.

The first frame 150 of FIG. 1B represents one frame of a sequence of frames (e.g., video). An autonomous driving system may control actions of the agent 100 based on the objects detected in each frame. The video generated from the sequence of frames may be stored at the agent 100 for analysis at a later time. Furthermore, the sensor data and/or the model output may also be stored at the agent 100 for analysis at a later time. For example, video, sensor data, and model output may be stored in a memory device of the agent. The stored video, sensor data, and/or model output may be transmitted to a remote device for further analysis by a human analyst.

As previously discussed, the analyst may use data (e.g., video and model output) received from an agent to determine whether a model's accuracy is greater than an accuracy threshold. For example, the analyst may receive the frame 150 of FIG. 1B to determine whether the model correctly labeled and annotated each object. Based on a visual inspection of the frame 150, the analyst may determine that the first bounding box 152 surrounds the first vehicle 104 and the second bounding box 154 surrounds the cyclist 118. The analyst may further determine that the labels ("car" and "bike rider") correspond to the first vehicle 104 and the cyclist 118. Based on the analysis, the analyst may determine that the model's accuracy is greater than the accuracy threshold.

Figure 1C:
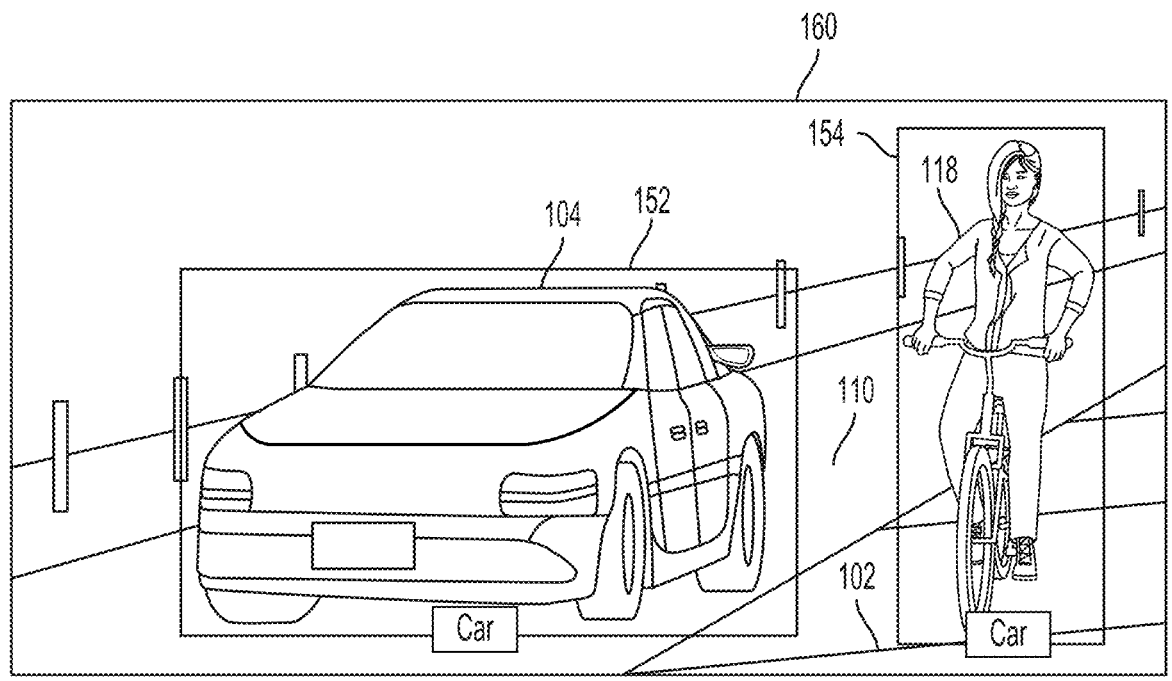

FIG. 1C illustrates an example of a second frame 160 generated by an object detection system, according to aspects of the present disclosure. In the present example, the second frame 160 has been uploaded to a server for further analysis. Based on a visual inspection of the second frame 160, the analyst may determine that the first bounding box 152 surrounds the first vehicle 104 and the second bounding box 154 surrounds the cyclist 118. The analyst may further determine that the label ("car") for the cyclist 118 is incorrect. The analyst's determination may be based on a visual analysis and the analyst's knowledge that a cyclist is not a car. Based on the analysis, the analyst may determine that there is an error in the model.

Upon detecting the error, the analyst may analyze additional frames from the agent 100 and/or other agents to determine whether the error is an anomaly (e.g., one time error) or a persistent error. As discussed herein, the error may be caused by an error in the model, an error in the model's computer code, and/or an error in the training data. In one configuration, the analyst also analyzes the sensor data to determine the cause of the error. Upon determining the cause of the error, one or more elements of the model may be adjusted to correct the error. The agent 100 may receive the adjusted model via a broadcast transmission, an Internet download, an update at a service center, or another system for upgrading the stored model.

Figure 1D:
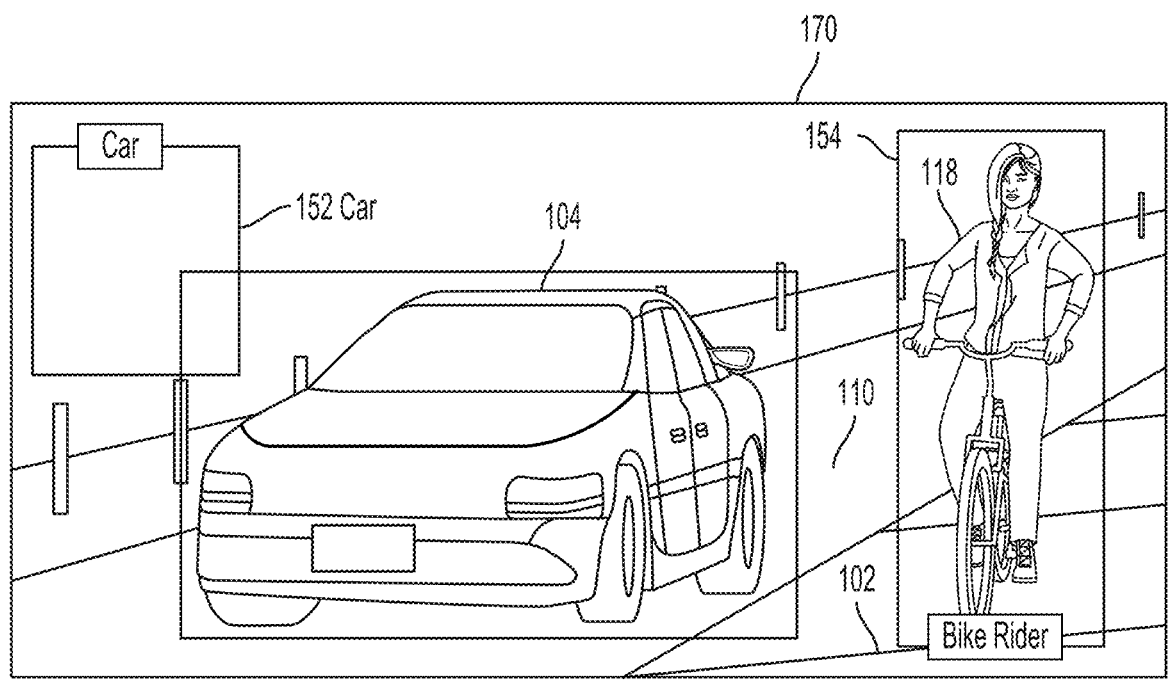

FIG. 1D illustrates an example of a third frame 170 generated by an object detection system, according to aspects of the present disclosure. In the present example, the third frame 170 has been uploaded to the remote device for further analysis. Based on a visual inspection of the third frame 170, the analyst may determine that the second bounding box 154 surrounds the cyclist 118. The analyst may also determine that the first bounding box 152 does not surround the first vehicle 104. Based on the analysis, the analyst may determine that there is an error in the model.

As previously discussed, one or more elements of the model may be adjusted upon determining the cause of the error. The agent 100 may receive the adjusted model via one or more model upgrade systems. Aspects of the present disclosure are not limited to the errors shown in FIGS. 1C and 1D. An analyst may determine other types of errors based on a visual inspection of a frame.

As discussed herein, an analyst may identify errors based on a visual inspection of a frame. However, an analyst's ability to identify errors based on a visual inspection of a frame is not directly correlated to the frame's high resolution. The analyst may still identify errors in sub-sampled frames. A sub-sampled frame refers to a frame with an adjusted resolution and/or an adjusted attribute.

In one configuration, a frame is sub-sampled by applying one or more filters to the frame. For example, the filters may adjust attributes, such as adjusting the frame's colors, removing background objects, removing object details, and/or adjusting other details of the frame. Additionally, the sub-sampling may compress the frame via a compression standard, such as Dirac, moving picture experts group (MPEG)-4, high efficiency video coding (HEVC), etc. Furthermore, the sub-sampling may adjust the video's frame-rate. For example, the frame rate may be adjusted from thirty frames per second to three frames per second. The sub-sampling may apply one or more of the aforementioned adjustments. Additionally, or alternatively, the sub-sampling may adjust other attributes of the frame to reduce the frame's memory footprint (e.g., size). In one configuration, the transmitted data includes sub-sampled frames and corresponding model outputs.

Figure 2:
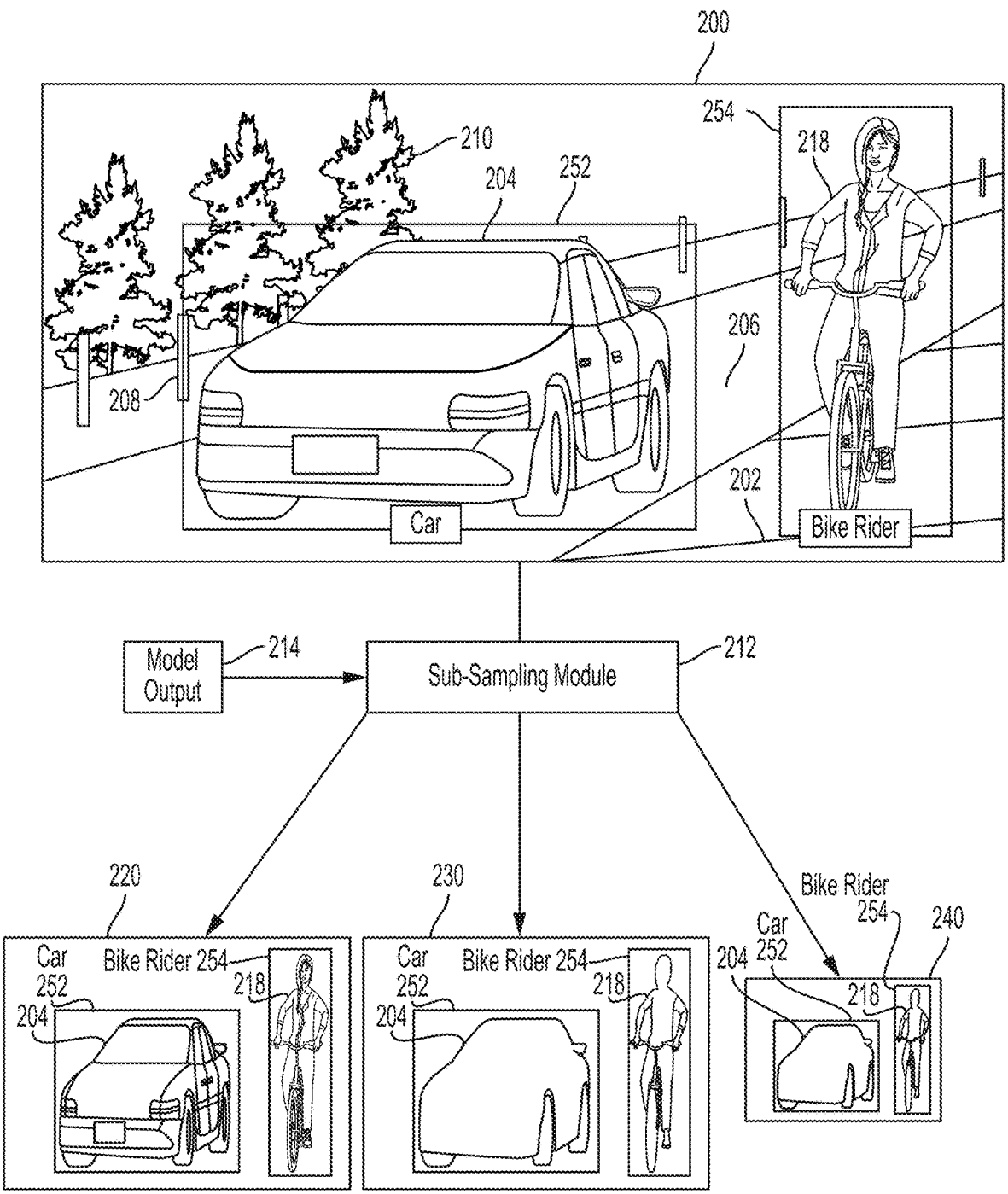
FIG. 2 illustrates an example of sub-sampling a frame according to aspects of the present disclosure.

FIG. 2 illustrates an example of sub-sampling an initial frame 200, according to aspects of the present disclosure. As shown in FIG. 2, the initial frame 200 may be processed by a sub-sampling module 212 of an agent. The initial frame 200 includes a vehicle 204 on a road 206 and a cyclist 218 on a bike lane 202 that is adjacent to the road 206. The initial frame 200 also includes a guardrail 208 and trees 210. An object detection model may have identified the first vehicle 204 and the cyclist 218 as objects of interest. Therefore, the model may output classification labels ("car" and "bike rider") and bounding boxes 252, 254 corresponding to the vehicle 204 and the cyclist 218, respectively.

The sub-sampling module 212 receives the initial frame 200 and a corresponding model output 214, such as classification labels ("car" and "bike rider") and bounding boxes 252, 254. For illustration purposes, the initial frame 200 of FIG. 2 is annotated with classification labels ("car" and "bike rider") and bounding boxes 252, 254. Still, the sub-sampling module 212 may receive the model output 214 as an input that is separate from the initial frame 200. The model output 214 may be used by the sub-sampling module 212 to identify the objects of interest 204, 218.

In one configuration, the sub-sampling module 212 generates a first sub-sampled frame 220 by removing objects that are not annotated by a bounding box 252, 254. The sub-sampling module 212 may use the model output 214 to distinguish objects 204, 218 bounded by the bounding box 252, 254 from other objects in the initial frame 200. As shown in FIG. 2, the trees 210, the guardrail 208, the road 206, and the bike lane 202 have been removed from the first sub-sampled frame 220. Furthermore, the sub-sampling module 212 has reduced a resolution (e.g., size) of the first sub-sampled frame 220, such that the resolution is less than a resolution of the initial frame 200.

In another configuration, the sub-sampling module 212 generates a second sub-sampled frame 230 by reducing a resolution of the sub-sampled frame 230, removing objects that are not annotated by a bounding box 252, and removing details of each object 204, 218 bounded by the bounding boxes 252, 254. For example, as shown in the second sub-sampled frame 230, the details of the vehicle 204 and the cyclist 218 have been removed, such that only the outlines remain. A memory footprint of the second sub-sampled frame 230 may be less than a memory footprint of the first sub-sampled frame 220.

In yet another configuration, the sub-sampling module 212 generates a third sub-sampled frame 240 by further reducing a resolution of the sub-sampled frame 240 in comparison to the resolution of the other sub-sampled frames 220, 230, removing objects that are not annotated by a bounding box 252, 254, and removing details of each object 204, 218 bounded by a bounding box 252, 254. As shown in FIG. 2, the details and size of each sub-sampled frame 220, 230, 240 are less than the details and size of the initial frame 200. Nonetheless, the accuracy of the model output may still be determined based on a visual analysis of each sub-sampled frame 220, 230, 240. As such, each frame may be sub-sampled without affecting an analyst's ability to determine whether the model output is greater than an accuracy threshold.

Of course, there may be a limit to the amount of sub-sampling that can be performed on a frame. That is, at some point, the sub-sampling may render an object ambiguous. For example, the sub-sampling may pixelate objects in a frame to a point where a human analyst cannot distinguish one object type (e.g., car) from another object type (e.g., bike rider). In one configuration, a sub-sampling model may be trained to sub-sample frames up to a sub-sampling threshold.

That is, a sub-sampling model may be trained to determine an amount of sub-sampling, a type of sub-sampling, and the elements to sub-sample based on the content of a frame. The training may compare results of the analysis on high resolution frames to results of an analysis on a sub-sampled frame. The sub-sampling model is trained to minimize an analysis loss between the analyses on high resolution videos to results of the analyses on sub-sampled frames.

In another configuration, different functions may be used to compress and/or sub-sample the video. The different compressions and sub-sampling may be tested with humans to determine the configurations that yield accurate feedback. For example, one function may find the outlines of actors and provide the outlines to the human. Another function may remove certain colors. Yet another function may reduce a resolution. In this configuration, the neural network is not trained. Rather, a system administrator determines the desired function for compressing and/or sub-sampling the video.

The sub-sampling model of the present disclosure may use a deep learning architecture. The deep learning architecture may be embodied in a deep convolutional neural network (CNN). During training, the CNN may be presented with various viewpoints of various object categories. The network designer may want the CNN to output an estimate of an unknown object and corresponding pose with a high degree of confidence. Before training, the output produced by the CNN is likely to be incorrect, and so an error may be calculated between the actual output and the target output. The weights of the CNN may then be adjusted so that the output of the CNN are more closely aligned with the target (e.g., ground truth).

To adjust the weights, a learning function may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

Figure 3:
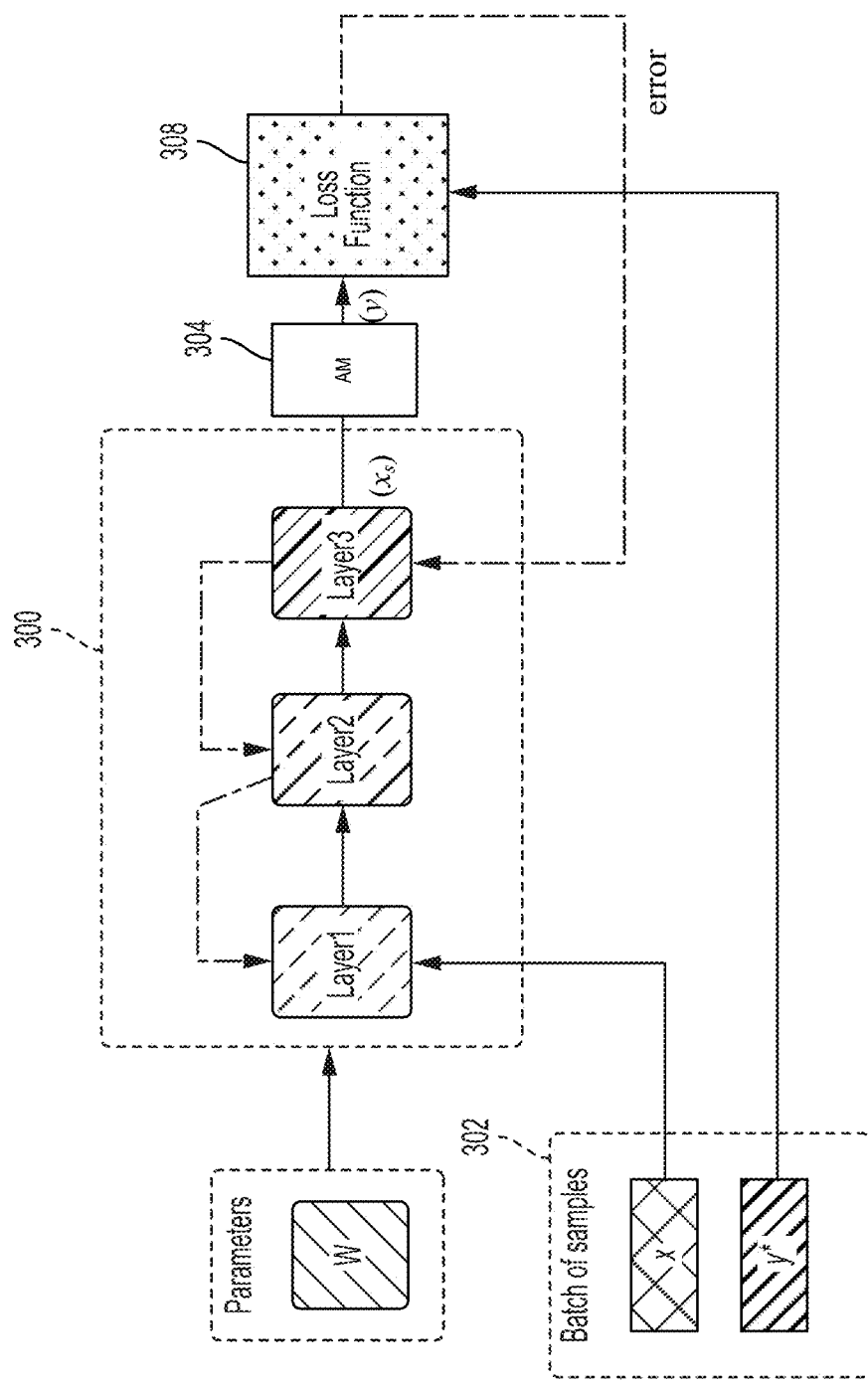
FIG. 3 illustrates a flow diagram for training a sub-sampling model according to aspects of the present disclosure.

FIG. 3 illustrates a flow diagram for training a sub-sampling model 300 according to an aspect of the present disclosure. In one configuration, annotated frames (x) are stored a data source 302, such as a training server. The annotated frames (x) refer to frames and corresponding classification data, such as labels and bounding boxes. The data source may also store ground truth errors (y*) corresponding to the annotated frames (x). The ground truth classification errors (y*) represent the true classification error in each annotated frame (x).

The sub-sampling model 300 may be initialized with a set of parameters w. The parameters may be used by layers of the sub-sampling model 300, such as layer 1, layer 2, and layer 3, of the sub-sampling model 300 to set weights and biases. Layer 3 may be a fully connected layer. During training, the sub-sampling model 300 receives annotated frames (x) to sub-sample the annotated frames (x). The sub-sampled frames ($x_s$) may be received at an analysis module (AM) 304.

At the AM 304, an analyst reviews the sub-sampled frames ($x_s$) to identify classification errors (y) in each frame. The classification errors (y) are received at a loss function 308. The loss function 308 compares the classification errors (y) to the ground truth classification errors (y*). The sub-sampling error is the difference (e.g., loss) between the classification errors (y) and the ground truth classification errors (y*). The sub-sampling error is output from the loss function 308 to the sub-sampling model 300. The error is backpropagated through the sub-sampling model 300 to update the parameters. The training may be performed during an offline phase of the sub-sampling model 300.

Aspects of the present disclosure reduce a time frame for analyzing a deployed model and improving a deployed model. The ability to detect errors upon deployment of a model reduces a number of in-field errors, thereby increasing the safety of the agent, passengers in the agent, and other agents or objects in a surrounding environment. Aspects of the present disclosure are not limited to transmitting sub-sampled frames. Data relating to other elements of an autonomous driving system may also be transmitted while the agent is active. The data related to other elements may also be encoded, compressed, and/or sub-sampled to account for the limitations of wireless communication systems.

For example, data related to route planning may be encoded, compressed, and/or sub-sampled. The data may include a map of a planned route, a map of alternate routes, traffic conditions on both the planned and alternate routes, as well as other information. A human analyst or a trained model may analyze the planned route to determine if there is an error in a planning module. Elements of the planning module and/or related modules may be updated to mitigate an error.

As another example, in addition, or alternate to, streaming video frames and a corresponding model output, the agent transmits road anomalies. The agent may store a map of a route and known route restraints, such as locations of traffic signals, speed limits, school zones, etc. An active agent may report incidents, such as traffic accidents or weather conditions, and/or road anomalies, such as a newly placed stop sign or a missing change in a map.

A sequence of frames may capture the incident and/or anomaly. The sequence of frames may be sub-sampled and streamed to a remote device upon detection of the incident and/or anomaly. An agent or trained model may pool similar reports from other agents to determine whether an alert should be transmitted to agents in an area. The alert may notify the agents of the detected incident and/or anomaly. In response to the alert, an agent may update a planned route to avoid an area, proceed with caution in an area, or perform other actions.

Figure 4:
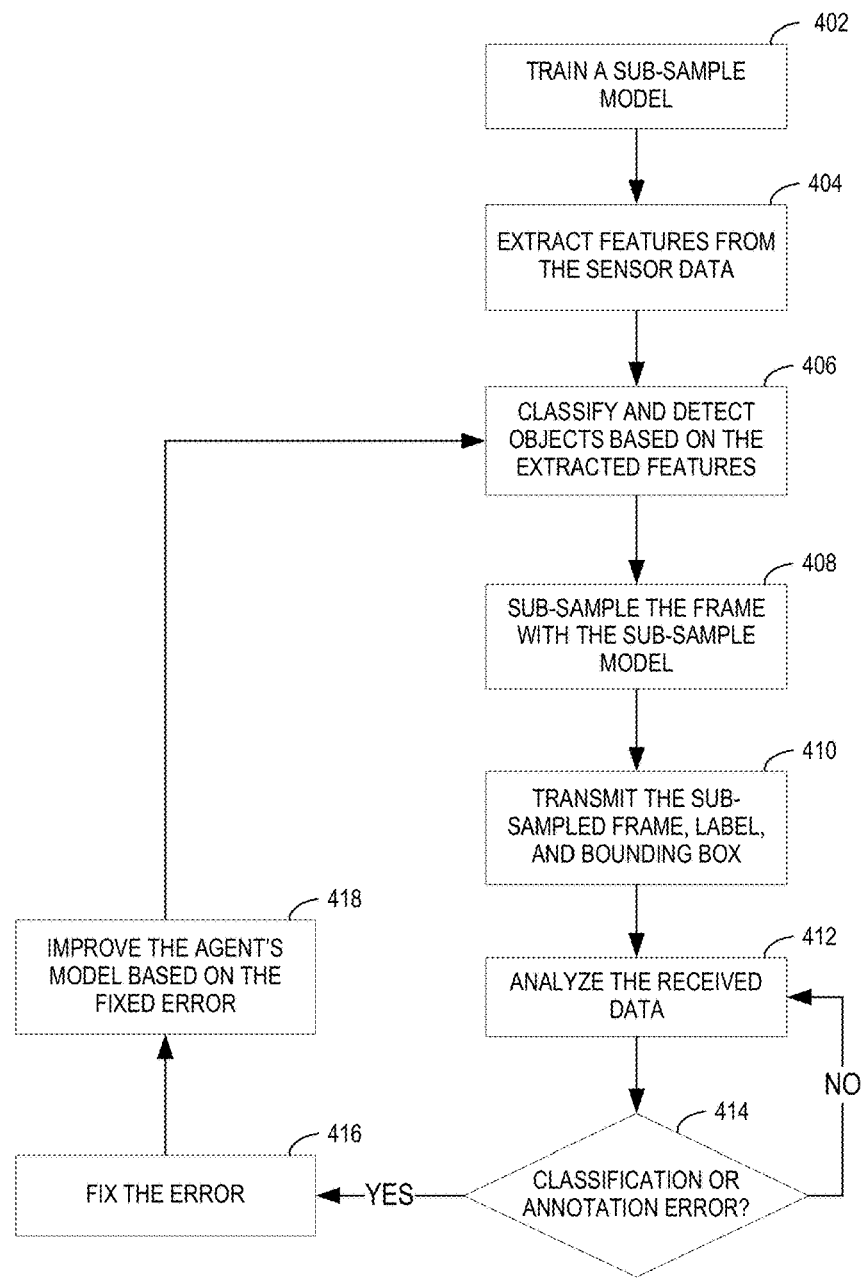
FIG. 4 illustrates a flow diagram for improving an autonomous driving system according to aspects of the present disclosure.

FIG. 4 is a flow diagram 400 for improving an autonomous driving system, according to aspects of the present disclosure. As shown in FIG. 4, at block 402 a sub-sampling model is trained to sub-sample frames. The training balances a frame's memory footprint and an analyst's ability to detect errors in the sub-sampled frame. That is, it is desirable to sub-sample a frame while minimizing the frame's memory footprint and maximizing the analyst's ability to detect errors in the sub-sampled frame.

At block 404, an object detection model extracts features from sensor data. The sensor data may be obtained from one or more sensors, such as a 2D RGB camera and/or a LIDAR sensor. The features may be extracted with an artificial neural network, such as a convolutional neural network. At block 406, the object detection system detects and classifies objects of interest in a frame based on the extracted features. The detected objects may be localized with a bounding box. Furthermore, the detected objects may be labeled.

At block 408, the sub-sampling model sub-samples the frame corresponding to the extracted features. The sub-sampling may include reducing a frame rate, reducing the frame's resolution, adjusting attributes of objects in the frame, compressing the frame, encoding the frame, reducing a number of channels of the frame, filtering elements out of the frame, and/or other techniques from reducing a memory footprint of the frame. At block 410, the agent transmits data including sub-sampled frame, the classification label, and the bounding box to a remote agent. The data may be transmitted via a wireless communication network while the agent is active in an environment. An active agent may refer to an agent that is on and in the process of driving.

At block 412, a human analyst reviews the transmitted data. The analyst may visually review the frame to determine if the bounding box has annotated a correct object. The analyst may also visually review the frame to determine if an object has been properly labeled. At block 414, the analyst determines if an error exists in the reviewed frame. If an error does not exist, the analyst proceeds to analyzing the next frame at block 412.

If an error exists, the analyst fixes the error (block 416). Fixing the error may include rolling back a software update, updating the model, re-training the model, and/or updating the software. At block 418, the agent's model is improved in response to fixing the error. The improvement may include receiving a model update, receiving a software update, or receiving an update to another component associated with the model.

Figure 5:
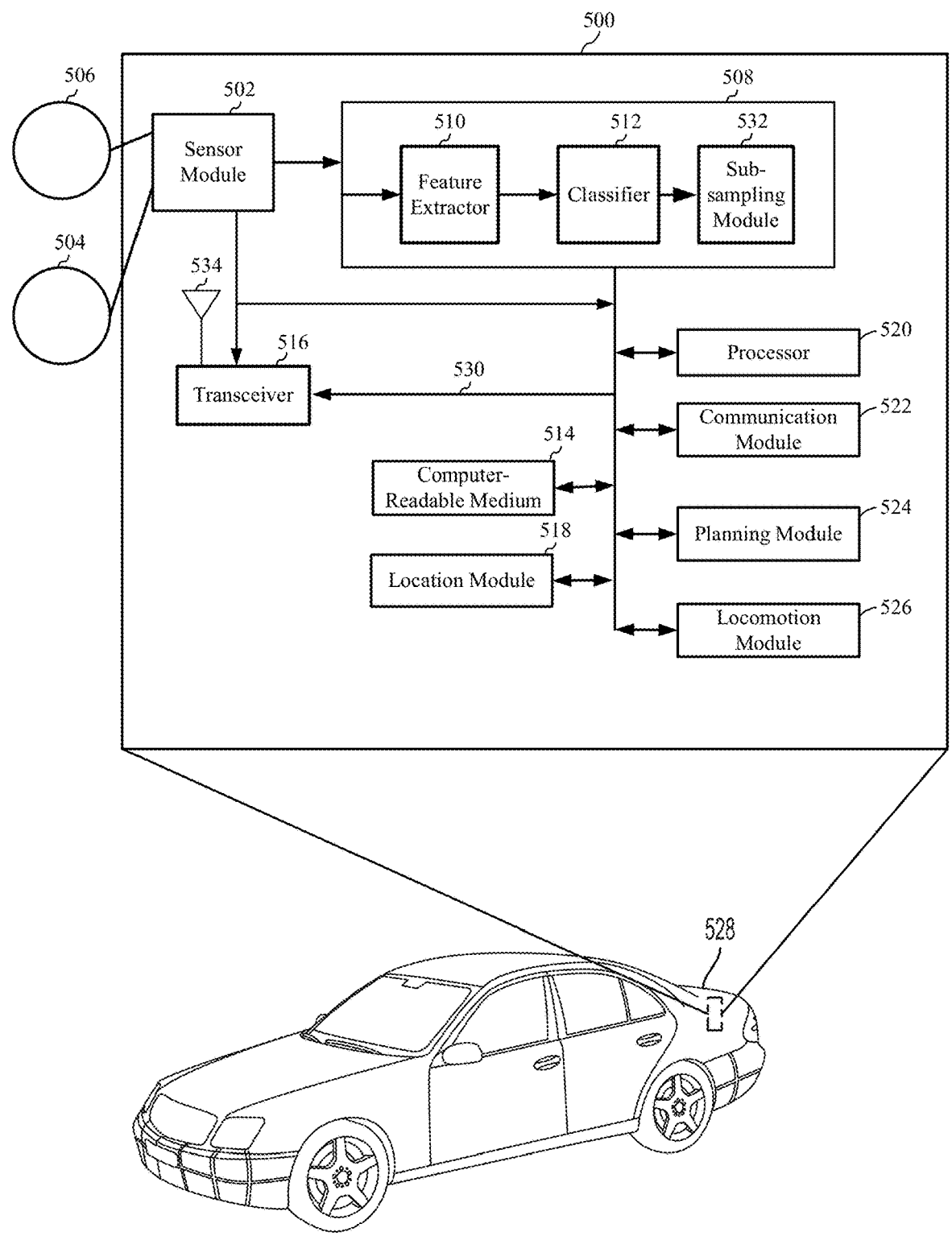
FIG. 5 is a diagram illustrating an example of a hardware implementation for an autonomous driving system according to aspects of the present disclosure.

FIG. 5 is a diagram illustrating an example of a hardware implementation for an autonomous driving system 500, according to aspects of the present disclosure. The autonomous driving system 500 may be a component of a vehicle, a robotic device, or other device. For example, as shown in FIG. 5, the autonomous driving system 500 is a component of a car 528. Of course, aspects of the present disclosure are not limited to the autonomous driving system 500 being a component of the car 528, as other devices, such as a bus, boat, drone, or robot, are also contemplated for using the autonomous driving system 500.

The autonomous driving system 500 may be implemented with a bus architecture, represented generally by a bus 530. The bus 530 may include any number of interconnecting buses and bridges depending on the specific application of the autonomous driving system 500 and the overall design constraints. The bus 530 links together various circuits including one or more processors and/or hardware modules, represented by a processor 520, a communication module 522, a location module 518, a sensor module 502, a locomotion module 526, a planning module 524, and a computer-readable medium 514. The bus 530 may also link various other circuits such as timing sources, peripherals, voltage regulators, and power management circuits, which are well known in the art, and therefore, will not be described any further.

The autonomous driving system 500 includes a transceiver 516 coupled to the processor 520, the sensor module 502, an artificial neural network module 508, the communication module 522, the location module 518, the locomotion module 526, the planning module 524, and the computer-readable medium 514. The transceiver 516 is coupled to an antenna 534. The transceiver 516 communicates with various other devices over a transmission medium. For example, the transceiver 516 may receive commands via transmissions from a user or a remote device. As another example, the transceiver 516 may transmit driving statistics and information from the artificial neural network module 508 to a server (not shown).

The autonomous driving system 500 includes the processor 520 coupled to the computer-readable medium 514. The processor 520 performs processing, including the execution of software stored on the computer-readable medium 514 providing functionality according to the disclosure. The software, when executed by the processor 520, causes the autonomous driving system 500 to perform the various functions described for a particular device, such as the car 528, or any of the modules 502, 508, 514, 516, 518, 520, 522, 524, 526. The computer-readable medium 514 may also be used for storing data that is manipulated by the processor 520 when executing the software.

The sensor module 502 may be used to obtain measurements via different sensors, such as a first sensor 506 and a second sensor 504. The first sensor 506 may be a vision sensor, such as a stereoscopic camera or a red-green-blue (RGB) camera, for capturing 2D images. The second sensor 504 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 504, 506. The measurements of the first sensor 506 and the second sensor 504 may be processed by one or more of the processor 520, the sensor module 502, the artificial neural network module 508, the communication module 522, the location module 518, the locomotion module 526, the planning module 524, in conjunction with the computer-readable medium 514 to implement the functionality described herein. In one configuration, the data captured by the first sensor 506 and the second sensor 504 may be transmitted to an external device via the transceiver 516. The first sensor 506 and the second sensor 504 may be coupled to the car 528 or may be in communication with the car 528.

The location module 518 may be used to determine a location of the car 528. For example, the location module 518 may use a global positioning system (GPS) to determine the location of the car 528. The communication module 522 may be used to facilitate communications via the transceiver 516. For example, the communication module 522 may be configured to provide communication capabilities via different wireless protocols, such as WiFi, long term evolution (LTE), 3G, etc. The communication module 522 may also be used to communicate with other components of the car 528 that are not modules of the autonomous driving system 500.

The locomotion module 526 may be used to facilitate locomotion of the car 528. As an example, the locomotion module 526 may control movement of the wheels. As another example, the locomotion module 526 may be in communication with a power source of the car 528, such as an engine or batteries. Of course, aspects of the present disclosure are not limited to providing locomotion via wheels and are contemplated for other types of components for providing locomotion, such as propellers, treads, fins, and/or jet engines.

The autonomous driving system 500 also includes the planning module 524 for planning a route or controlling the locomotion of the car 528, via the locomotion module 526, based on the analysis performed by the artificial neural network 508. In one configuration, the planning module 524 overrides the user input when the user input is expected (e.g., predicted) to cause a collision. The modules may be software modules running in the processor 520, resident/stored in the computer-readable medium 514, one or more hardware modules coupled to the processor 520, or some combination thereof.

The artificial neural network 508 may be in communication with the sensor module 502, the transceiver 516, the processor 520, the communication module 522, the location module 518, the locomotion module 526, the planning module 524, and the computer-readable medium 514. In one configuration, the artificial neural network 508 receives sensor data from the sensor module 502. The sensor module 502 may receive the sensor data from the first sensor 506 and the second sensor 504. According to aspects of the disclosure, the sensor module 502 may filter the data to remove noise, encode the data, decode the data, merge the data, extract frames, or perform other functions. In an alternate configuration, the artificial neural network 508 may receive sensor data directly from the first sensor 506 and the second sensor 504.

As shown in FIG. 5, the artificial neural network 508 may include a feature extractor 510, a classifier 512, and a sub-sampling module 532. The feature extractor 510, the classifier 512, and the sub-sampling module 532 may be components of a same or different artificial neural network, such as a deep convolutional neural network (CNN). The artificial neural network 508 is not limited to a CNN and may be another type of artificial neural network, such as a support vector machine (SVM). The feature extractor 510 receives a data stream from the first sensor 506 and the second sensor 504. The data stream may include a 2D RGB image from the first sensor 506 and LIDAR data points from the second sensor 504. Different spatial environments may be captured in each data stream. Additionally, the LIDAR data points may be separated to multiple streams. For example, one LIDAR data stream may provide a bird's eye view spatial representation and another LIDAR data stream may provide a forward facing view spatial representation. The data stream may include multiple frames, such as image frames.

The feature extractor 510 extracts (e.g., identifies) areas of interest from each frame of the data stream. For example, the feature extractor 510 may be trained to extract features of objects of interest. As another example, the feature extractor 510 may be trained to extract features of different terrains, such as roads, sidewalks, buildings, and background. That is, the feature exactor 510 identifies areas of attention based on the training. The artificial neural network 508 may include one or more feature extractors 510. For example, one feature extractor 510 may be configured to detect objects and another feature extractor 510 may be configured to segment different elements of the data, such as roads, sidewalks, buildings, and background. In another example, each data stream output from a sensor 502, 504 may be received at distinct feature extractors 510.

The feature extractor 510 may encode each set of features in a multi-dimensional tensor. The classifier 512 classifies each set of features received from the feature extractor 510. The classifier 512 may classify (e.g., label) one or more objects of interest and localize each object of interest with a bounding box. The feature extractor 510 and classifier 512 may be referred to as an object detection model.

The classifier 512 may output the label and the bounding box to one or more of the sensor module 502, the transceiver 516, the processor 520, the communication module 522, the location module 518, the locomotion module 526, the planning module 524, and the computer-readable medium 514. For example, the classified features may be output to the processor 520 to determine a set of actions that may be performed based on the detected objects and their respective locations in relationship to the car 528. The actions may be retrieved from the computer-readable medium 514 or the planning module 524. Additionally, based on the classified features, one or more of the modules 502, 508, 514, 516, 518, 520, 522, 524, 526 may determine or update an action for the car 528. The planning module 524 may perform route planning, collision avoidance, or other planning functionality based on the classified features.

Furthermore, the classifier 512 may output the label and the bounding box to a sub-sampling module 532. The sub-sampling module 532 may also receive sensor data, such as a 2D RGB image from the first sensor 506. The sub-sampling module 532 may sub-sample the received image to reduce the memory footprint of the 2D RGB image.

The sub-sampling may be performed based on the labels and bounding boxes received from the classifier 512. The sub-sampling module 532 performs the sub-sampling based techniques discussed in detail herein. The sub-sampled image may be output to the transceiver 516 for transmission to a remote device. As discussed herein, the sub-sampled image, the label, and the bounding box may be streamed to the remote device for human analysis. Based on the human analysis, the transceiver 516 may receive updates to one or more of the modules 502, 508, 514, 516, 518, 520, 522, 524, 526. The updates may improve the functionality of the car 528.

Figure 6:
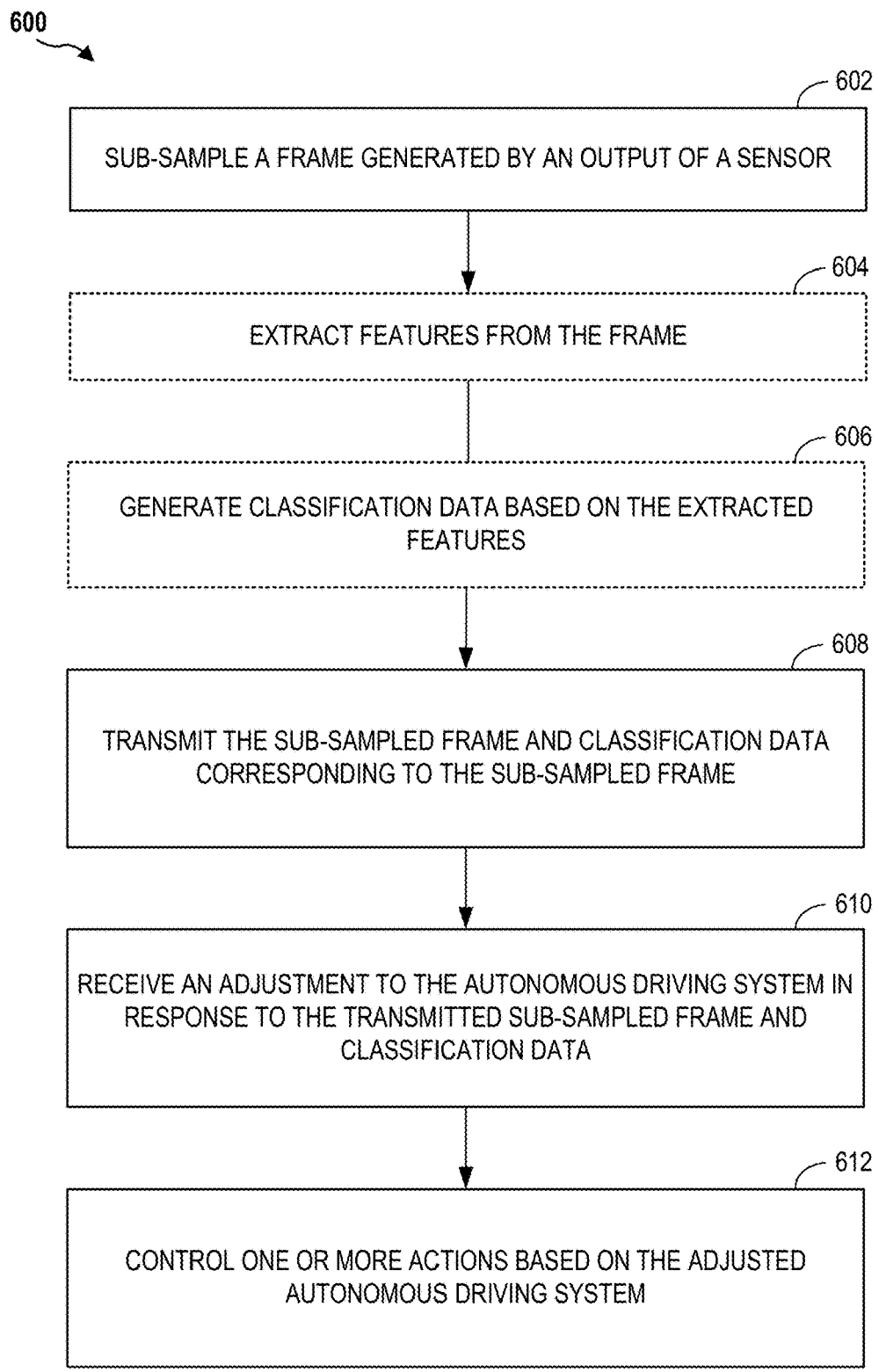
FIG. 6 illustrates a method for improving an autonomous driving system according to aspects of the present disclosure.

FIG. 6 illustrates a method 600 for improving an autonomous driving system according to an aspect of the present disclosure. At block 602, at autonomous vehicle sub-samples a frame generated by an output of a sensor. The sub-sampling may include, at least, compressing the frame, reducing a frame rate, filtering an attribute of the frame, or a combination thereof. The sensor may be an RGB camera, LIDAR, RADAR, or another type of sensor. Additionally, the frame may be generated be one or more sensors. As an example, the frame may be a forward facing view of the autonomous vehicle. The frame may include the image captured by the RGB camera. In addition, or alternatively, the frame may include information from the LIDAR sensor and/or RADAR sensor.

In an optional configuration, at block 604, the autonomous vehicle extracts features from the frame. The features may be extracted by an artificial neural network, such as a convolutional neural network. In another optional configuration, at block 606, the autonomous vehicle generates classification data based on the extracted features. The classification data may include a label and a bounding box.

At block 608, the autonomous vehicle transmits the sub-sampled frame and classification data corresponding to the sub-sampled frame. The sub-sampled frame and the corresponding classification data may be transmitted to a remote device, such as a server. The server may be associated with, at least, the vehicle manufacturer, a developer of a machine learning model, a developer of the vehicle's software, a government entity, and/or a quality assurance organization. The sub-sampled frame and the corresponding classification data may be transmitted via a wireless network, such as a cellular wireless network.

At block 610, the autonomous vehicle receives an adjustment to the autonomous driving system in response to the transmitted sub-sampled frame and classification data. The adjustment may be received from the entity that received the sub-sampled frame and the corresponding classification data or another entity. In one configuration, the adjustment to the autonomous driving system is received when a review of the sub-sampled frame and the classification data indicates that an accuracy of the classification data is less than an accuracy threshold. The adjustment to the autonomous driving system may include, at least, a re-trained object classification model, a software roll back, and/or a software update.

Finally, at block 612, the autonomous vehicle controls one or more actions based on the adjusted autonomous driving system. Controlling the action may include planning a route or adjusting a planned route. For example, the adjustment may improve the autonomous vehicle's ability to identify certain road hazards, such as ice on the road. Based on the adjusted, the autonomous vehicle may adjust an action, such as reducing the driving speed or changing lanes, when ice is detected.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for method for providing updating a behavior system of an agent, comprising:
   transmitting, to the agent, the behavior system for controlling a behavior of the agent;
   receiving, from the agent, a sub-sampled sensor data and classification data corresponding to an object of interest identified from sensor data of the agent the sub-sampled sensor data generated at the agent based on the sensor data captured by a sensor of the agent;
   generating annotated sensor data based on the sub-sampled sensor data and the classification data;
   adjusting a parameter of the behavior system to correct an error in the annotated sensor data; and
   transmitting, to the agent, a behavior system update comprising the adjusted parameter, such that the behavior of the agent is adjusted based on the adjusted parameter.

2. The method of claim 1, in which:
   the classification data is based on features extracted from the sensor data; and
   the classification data comprises a label and a bounding box.

3. The method of claim 1, in which the sub-sampled sensor data comprises at least one of compressed sensor data, reduced frame rate sensor data, filtered sensor data, or a combination thereof.

4. The method of claim 1, further comprising receiving the sub-sampled sensor data and the classification data via a wireless network while the agent is actively operating in an environment.

5. The method of claim 1, further comprising:
   reviewing the sub-sampled sensor data and the classification data;
   determining an accuracy of the classification data is less than an accuracy threshold based on the review of the sub-sampled sensor data and the classification data; and
   adjusting the parameter when the accuracy is less than the accuracy threshold.

6. The method of claim 1, in which adjusting the parameter of the behavior system comprises at least one of re-training an object classification model of the behavior system, rolling back software of the behavior system, upgrading software of the behavior system, or a combination thereof.

7. The method of claim 1, in which:
   the behavior comprises planning a route for the agent or adjusting a planned route of the agent; and
   the agent comprises an autonomous vehicle.

8. An apparatus for adjusting a behavior system of an agent, comprising:
   a processor;
   a memory coupled with the processor; and
   instructions stored in the memory and operable, when executed by the processor, to cause the apparatus:
      to transmit, to the agent, the behavior system for controlling a behavior of the agent;
      to receive, from the agent, a sub-sampled sensor data and classification data corresponding to an object of interest identified from sensor data of the agent, the sub-sampled sensor data generated at the agent based on the sensor data captured by a sensor of the agent;
      to generate annotated sensor data based on the sub-sampled sensor data and the classification data;
      to adjust a parameter of the behavior system to correct an error in the annotated sensor data; and
      to transmit, to the agent, a behavior system update comprising the adjusted parameter, such that the behavior of the agent is adjusted based on the adjusted parameter.

9. The apparatus of claim 8, in which:
   the classification data is based on features extracted from the sensor data; and
   the classification data comprises a label and a bounding box.

10. The apparatus of claim 8, in which the sub-sampled sensor data comprises at least one of compressed sensor data, reduced frame rate sensor data, filtered sensor data, or a combination thereof.

11. The apparatus of claim 8, in which execution of the instructions further cause the apparatus to receive the sub-sampled sensor data and the classification data via a wireless network while the agent is actively operating in an environment.

12. The apparatus of claim 8, in which execution of the instructions further the apparatus:
   to review the sub-sampled sensor data and the classification data;
   to determine an accuracy of the classification data is less than an accuracy threshold based on the review of the sub-sampled sensor data and the classification data; and
   to adjust the parameter when the accuracy is less than the accuracy threshold.

13. The apparatus of claim 8, in which execution of the instructions further the apparatus to adjusting the parameter of the behavior system by performing at least one of re-training an object classification model of the behavior system, rolling back software of the behavior system, upgrading software of the behavior system, or a combination thereof.

14. The apparatus of claim 8, in which:
   the at least one behavior comprises planning a route for the agent or adjusting a planned route of the agent; and
   the agent comprises an autonomous vehicle.

15. A non-transitory computer-readable medium having program code recorded thereon for adjusting a behavior system of an agent, the program code executed by a processor and comprising:

program code to transmit, to the agent, the behavior system for controlling a behavior of the agent;

program code to receive, from the agent, a sub-sampled sensor data and classification data corresponding to an object of interest identified from sensor data of the agent, the sub-sampled sensor data generated at the agent based on the sensor data captured by a sensor of the agent;

program code to generate annotated sensor data based on the sub-sampled sensor data and the classification data;

program code to adjust a parameter of the behavior system to correct an error in the annotated sensor data; and program code to transmit, to the agent, a behavior system update comprising the adjusted parameter, such that the behavior of the agent is adjusted based on the adjusted parameter.

16. The non-transitory computer-readable medium of claim 15, in which:
the classification data is based on features extracted from the sensor data; and
the classification data comprises a label and a bounding box.

17. The non-transitory computer-readable medium of claim 15, in which the sub-sampled sensor data comprises at least one of compressed sensor data, reduced frame rate sensor data, filtered sensor data, or a combination thereof.

18. The non-transitory computer-readable medium of claim 15, in which the program code further comprises program code to receive the sub-sampled sensor data and the classification data via a wireless network while the agent is actively operating in an environment.

19. The non-transitory computer-readable medium of claim 15, further comprising:
program code to review the sub-sampled sensor data and the classification data;
program code to determine an accuracy of the classification data is less than an accuracy threshold based on the review of the sub-sampled sensor data and the classification data; and
program code to adjust the parameter when the accuracy is less than the accuracy threshold.

20. The non-transitory computer-readable medium of claim 15, in which the program code to adjust the parameter of the behavior system comprises program code to at least re-train an object classification model of the behavior system, roll back software of the behavior system, or upgrade software of the behavior system.

* * * * *